P. W. GATES.
MOLDING MACHINE.
APPLICATION FILED FEB. 18, 1920.

1,400,282.

Patented Dec. 13, 1921.
2 SHEETS—SHEET 2.

Inventor
Philetus W. Gates
By Sheridan, Jones, Sheridan and Smith.
Attys.

UNITED STATES PATENT OFFICE.

PHILETUS W. GATES, OF CHICAGO, ILLINOIS, ASSIGNOR TO HANNA ENGINEERING WORKS, OF CHICAGO, ILLINOIS, A CORPORATION OF ILLINOIS.

MOLDING-MACHINE.

1,400,282.  Specification of Letters Patent.  Patented Dec. 13, 1921.

Application filed February 18, 1920. Serial No. 359,518.

*To all whom it may concern:*

Be it known that I, PHILETUS W. GATES, a citizen of the United States, residing at Chicago, in the county of Cook and State of Illinois, have invented certain new and useful Improvements in Molding-Machines, of which the following is a specification.

This invention relates to improvements in molding machines, and has for its object to provide in connection with mechanism comprising a cylinder and a reciprocating plunger means to guide the reciprocating member in its reciprocation, and means to center or position the reciprocating member properly toward adjustment of the guiding means.

The specific invention disclosed herein is an improvement on the mechanism shown in patent to Krause 1,328,526, and will be more fully described and set forth in the following specification and shown in the accompanying drawings, in which—

Like numerals refer to like elements throughout the drawings, in which—

10 indicates a cylinder in which is reciprocably mounted a plunger 11, carrying at its upper portion a table 12. The table is intended to carry a flask and pattern, the specific embodiment of my invention shown being what is known as a jolt ramming machine, in which rapidly recurring jolts are imparted to the plunger, and thereby to the molding flask, to settle or compact the molding sand. It will be obvious that my invention is applicable to any similar type of mechanism, whether used in mold operations or not.

The table 12 is secured by suitable bolts or studs $12^a$ to the top of the plunger 11. The cylinder adjacent the bottom thereof is provided with a chamber or cavity $10^a$ in which is seated the valve mechanism, shown in outline in Fig. 1 of the drawings. This valve mechanism in the embodiment shown is of the type known as the Mumford-Huggins jolt valve, and needs no description herein, inasmuch as it forms no part of the present invention. It is sufficient to state that the air is applied beneath the plunger to lift the same a desired distance, in which cut-off and exhaust takes place, and the plunger descends under the force of its own weight to impact, when the valve is positively opened to repeat the cycle.

The plunger 11 is recessed in the bottom portion, as indicated by numeral $11^a$, to contact the valve block $10^a$.

Figure 1:
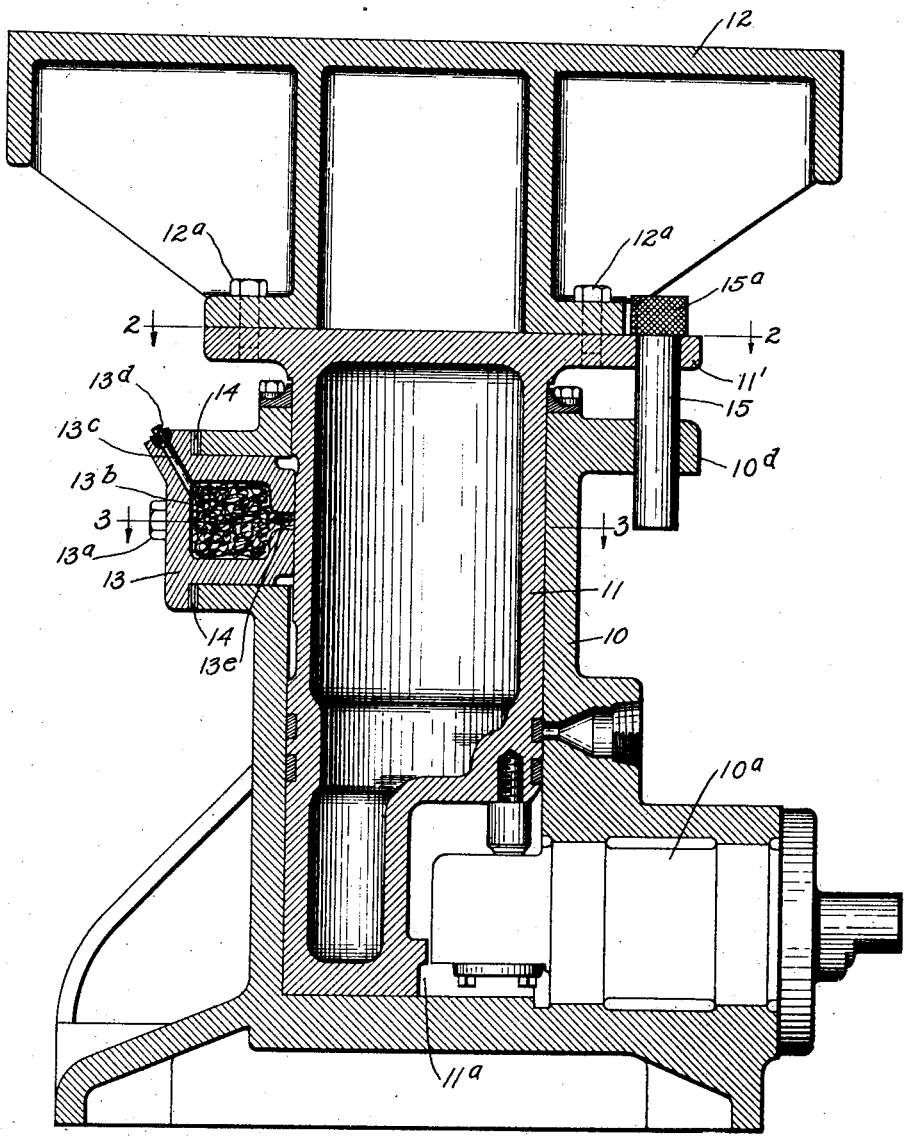
Figure 1 is a vertical section through a machine embodying my invention.
Figure 3:
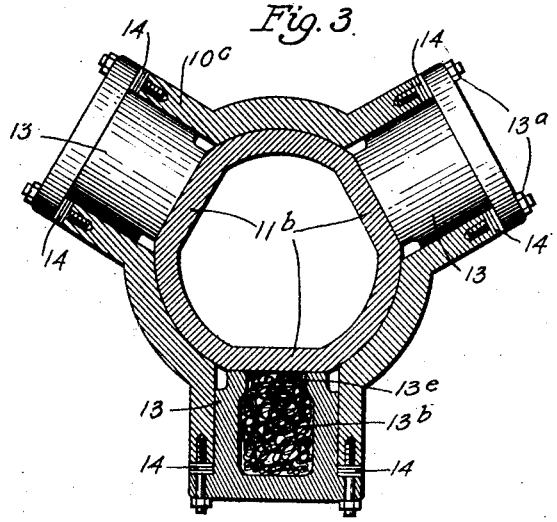
Fig. 3 is a similar section taken on the line 3—3 of Fig. 1.

As disclosed in the patent to Krause above mentioned, the plunger is constructed with a plurality of flattened portions $11^b$ constituting bearing surfaces, as shown in Figs. 1 and 3, for example. The cylinder is provided with flanged recesses $10^c$ opposite these flattened portions, and in these recesses closely fit the guide blocks 13, secured in place by screws or bolts $13^a$, shims 14, or the like, being interposed between the heads of the blocks and the flanges surrounding the recesses or chambers $10^c$. These blocks are preferably constructed with a cavity $13^b$, in which is placed felt or waste, a lubricant channel $13^c$ being provided leading to cavities $13^b$ and being normally closed by a cap $13^d$, this feature permitting the introduction of lubricant to saturate the material in the cavity $13^b$. An outlet duct $13^e$ leads from each of the cavities $13^b$ to insure lubrication of the contacting surfaces of the blocks 13 and plunger 11, as shown in Fig. 3, for example. The construction so far described is disclosed and covered in the patent to Krause mentioned above.

Figure 2:
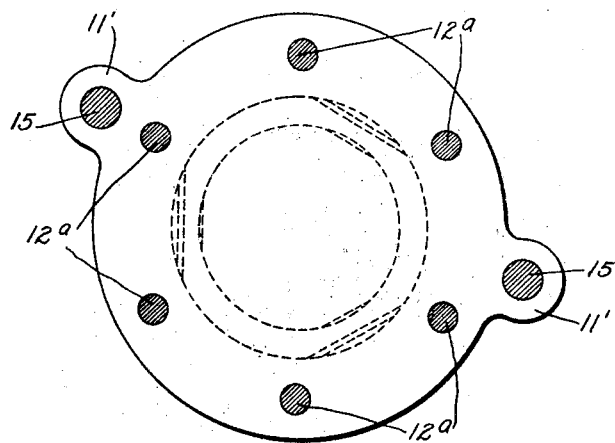
Fig. 2 is a transverse section taken on the line 2—2 of Fig. 1.

I have found that the wear between the respective faces $11^b$ of the plunger and the guides 13 are usually not the same amount and, therefore, it is very difficult to aline the center of plunger with the center of the cylinder so that each guide may be adjusted to take up its exact proportion of the wear, and, since this vitally concerns the adjustment itself, it is highly desirable to have some positioning or centering means. To accomplish this purpose I have constructed flanges 11' upon the upper surface of the plunger 11, two of these flanges being provided as ordinarily sufficient, although more may be utilized if desired. Similar flanges $10^d$ project outwardly from the top of the cylinder 10. Both sets of flanges are in alinement, and are provided with lining apertures therethrough. When it is desired to center or position the plunger relative to the cylinder prior to the adjustment of the guide blocks, a centering pin 15, having a knurled head 15ᵃ, is dropped into the apertures in the flanges 10ᵇ and 11′, as viewed in Figs. 1 and 2 of these centering pins in the two pairs of apertures, conserving to retain the plunger in proper position relative to the cylinder while the necessary adjustment of the guide blocks is made. The requisite number of shims 14 is then removed from each respective guide block to allow that particular block to be moved in just sufficiently to contact with the plunger and thus take up the exact wear at that guide and when all are thus adjusted and set the centering pins 15 are removed. The centers of the cylinder and plunger are again in line and will so remain until further wear takes place and another adjustment is desirable.

It will be obvious that by this means I am enabled to center and position the plunger readily, and greatly expedite the adjustment of the guide blocks.

It will also be obvious that my invention is susceptible of various modifications and improvements, and that I do not wish to be restricted to the form shown and described, except as defined in the appended claims.

I claim:—

1. A cylinder, a plunger removably mounted therein, said cylinder having a plurality of flanges and said plunger having a plurality of coacting flanges, both sets of said flanges being provided with alining apertures, and centering members adapted to enter said apertures and thereby center said plunger in said position.

2. A cylinder, a plurality of guiding members carried thereby, a plunger reciprocably mounted in said cylinder, guiding members coacting with said plunger to guide the same in its reciprocation and being adjustable relative to said plunger, and means to center said plunger relative to said cylinder during adjustment of said guiding members.

3. A cylinder, a plurality of guiding members carried thereby, a plunger reciprocably mounted in said cylinder, guiding members coacting with said plunger to guide the same in its reciprocation and being adjustable relative to said plunger, said plunger being provided with apertured flanges and said cylinder being similarly provided with apertured flanges, and centering members adapted to fit in said apertures and center said plunger with respect to said cylinder.

4. A cylinder, a plurality of guiding members carried thereby, a plunger reciprocably mounted in said cylinder, guiding members coacting with said plunger to guide the same in its reciprocation and being adjustable relative to said plunger, said plunger being provided with apertured flanges and said cylinder being similarly provided with apertured flanges, and centering members adapted to fit in said apertures and center said plunger with respect to said cylinder, said centering members comprising removable pins.

In testimony whereof, I have subscribed my name.

PHILETUS W. GATES.